March 14, 1939.  H. G. CRAIG ET AL  2,150,761

TICKET PRINTING AND ISSUING MACHINE

Filed Jan. 29, 1936  9 Sheets-Sheet 1

INVENTOR.
Harry G. Craig
Alfred W. Pride
BY Chas. E. Townsend.
ATTORNEY.

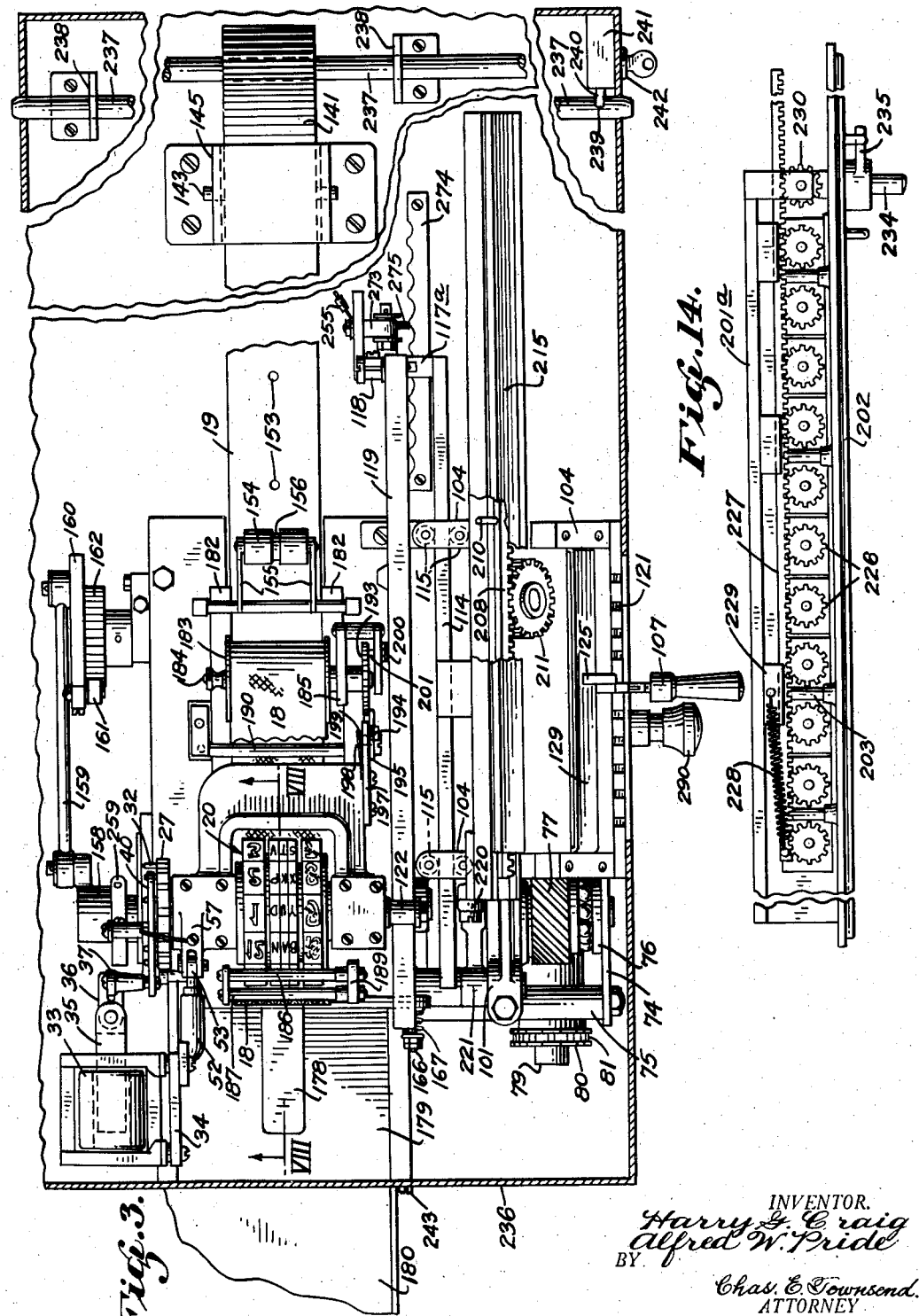

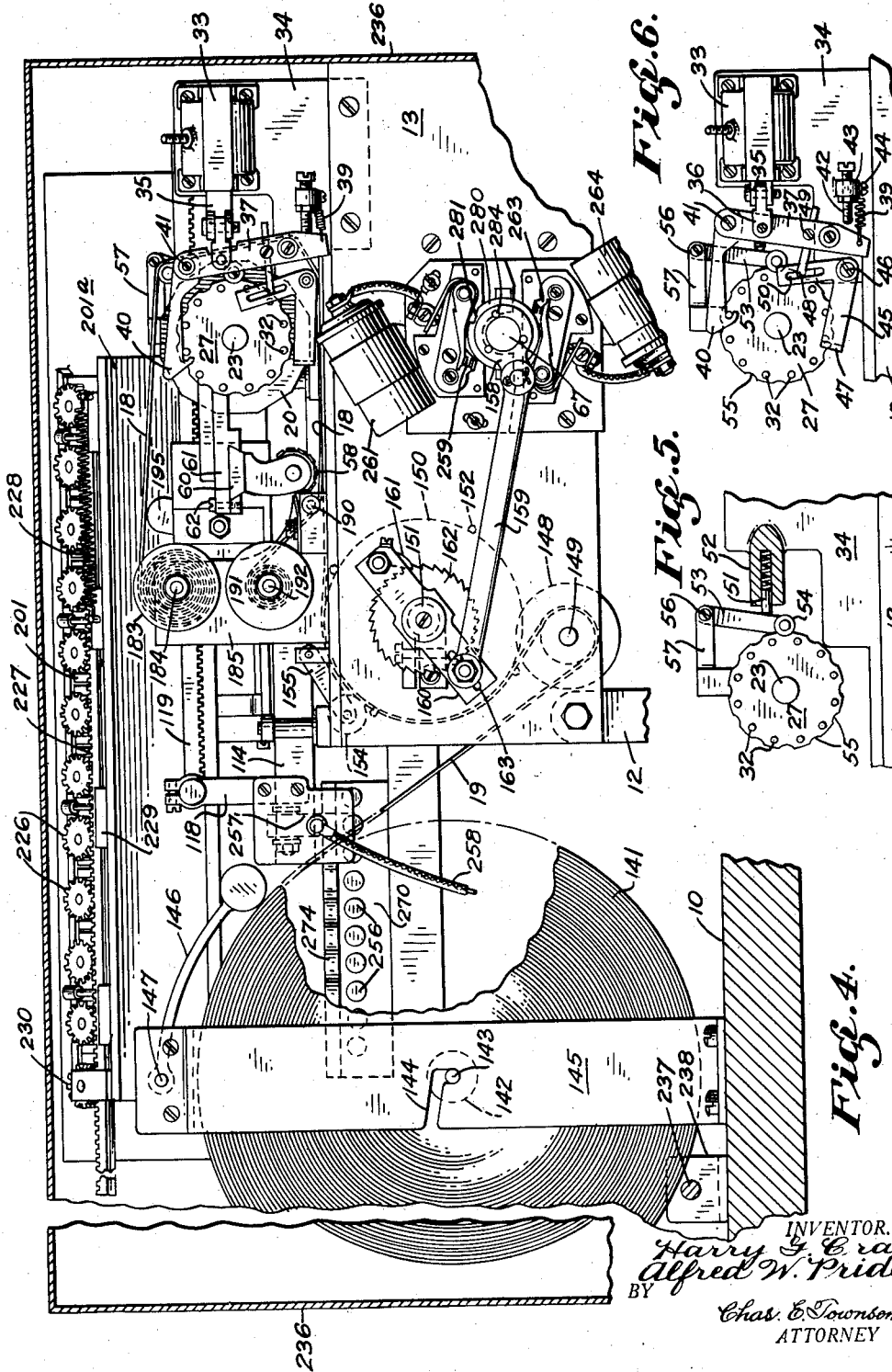

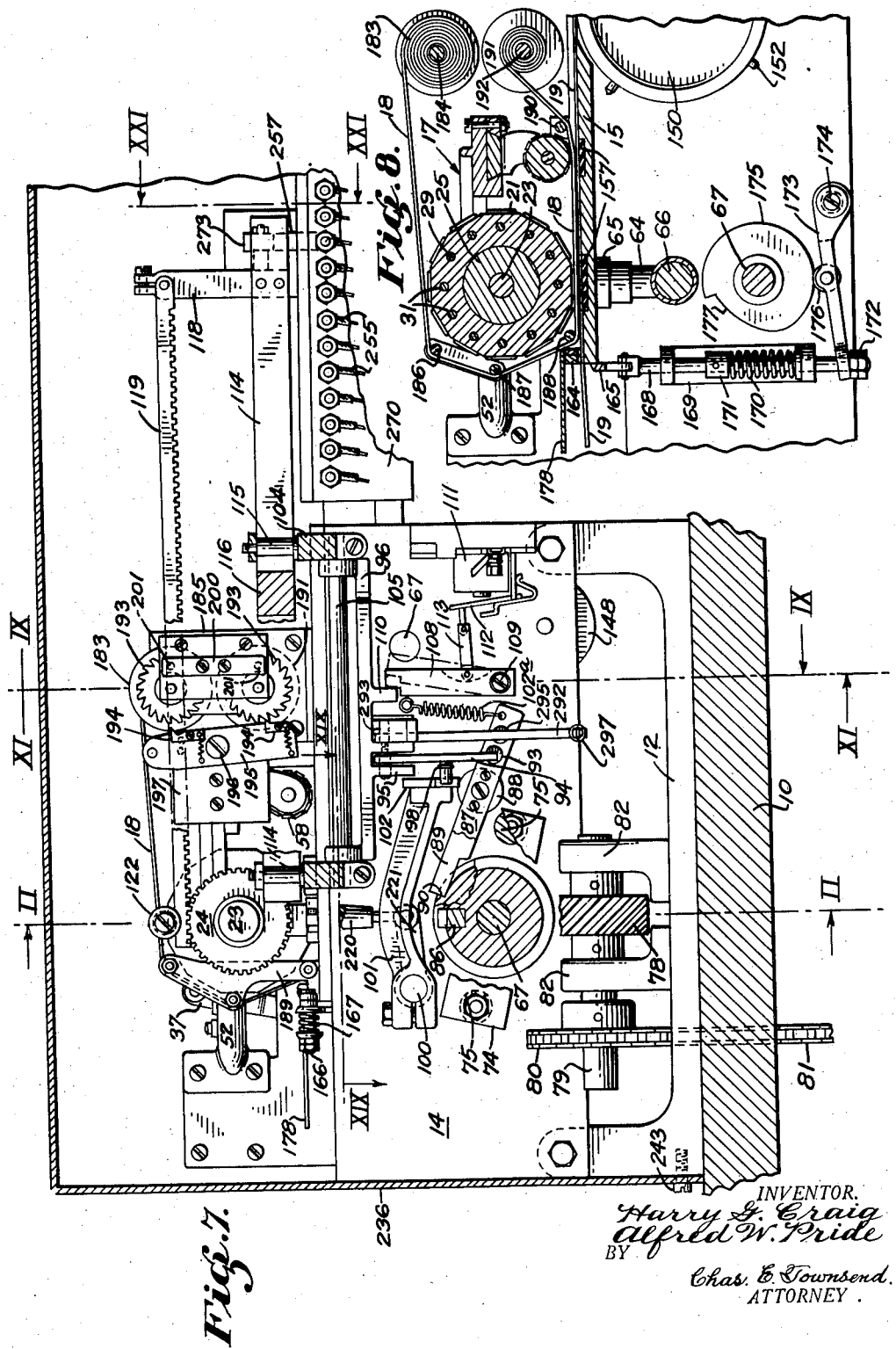

March 14, 1939.　　H. G. CRAIG ET AL　　2,150,761
TICKET PRINTING AND ISSUING MACHINE
Filed Jan. 29, 1936　　9 Sheets-Sheet 5

INVENTOR.
Harry G. Craig
Alfred W. Pride
BY
Chas. E. Townsend.
ATTORNEY.

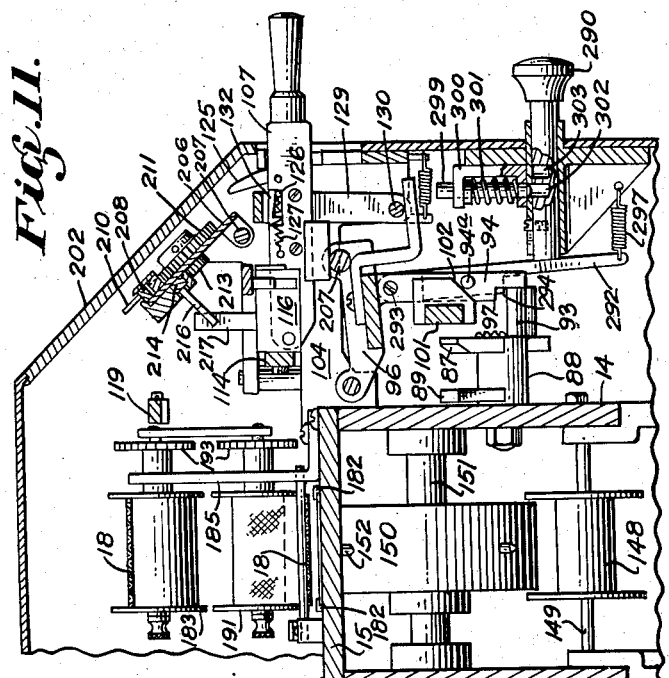

March 14, 1939. H. G. CRAIG ET AL 2,150,761
TICKET PRINTING AND ISSUING MACHINE
Filed Jan. 29, 1936 9 Sheets-Sheet 7
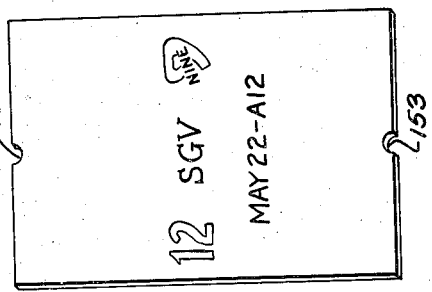
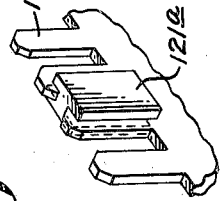
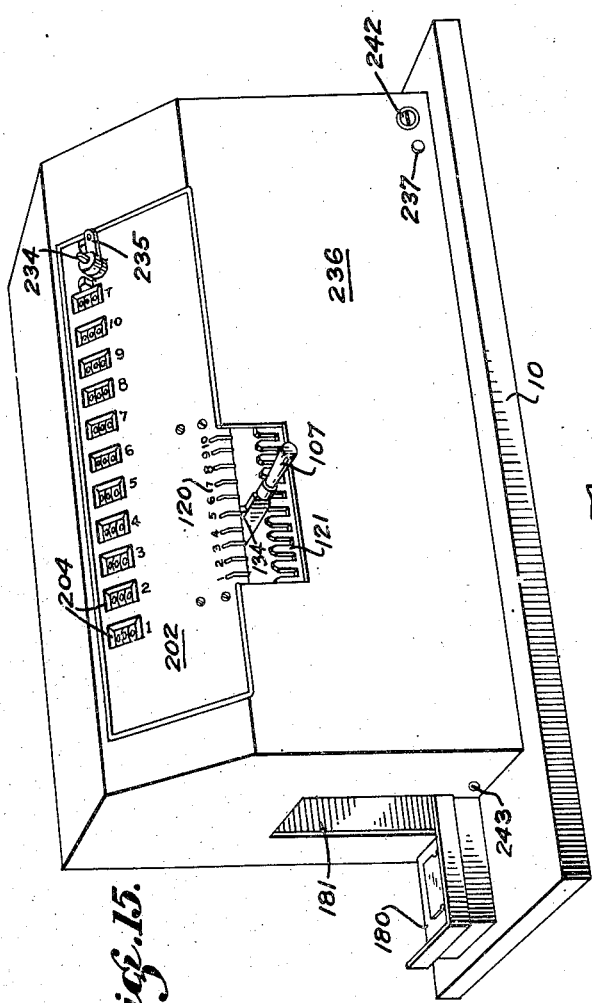
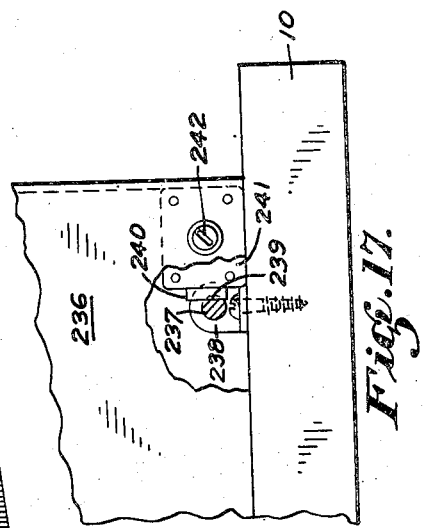
INVENTOR.
Harry G. Craig
Alfred W. Pride
BY Chas. E. Townsend
ATTORNEY.

March 14, 1939.　　H. G. CRAIG ET AL　　2,150,761
TICKET PRINTING AND ISSUING MACHINE
Filed Jan. 29, 1936　　9 Sheets-Sheet 8
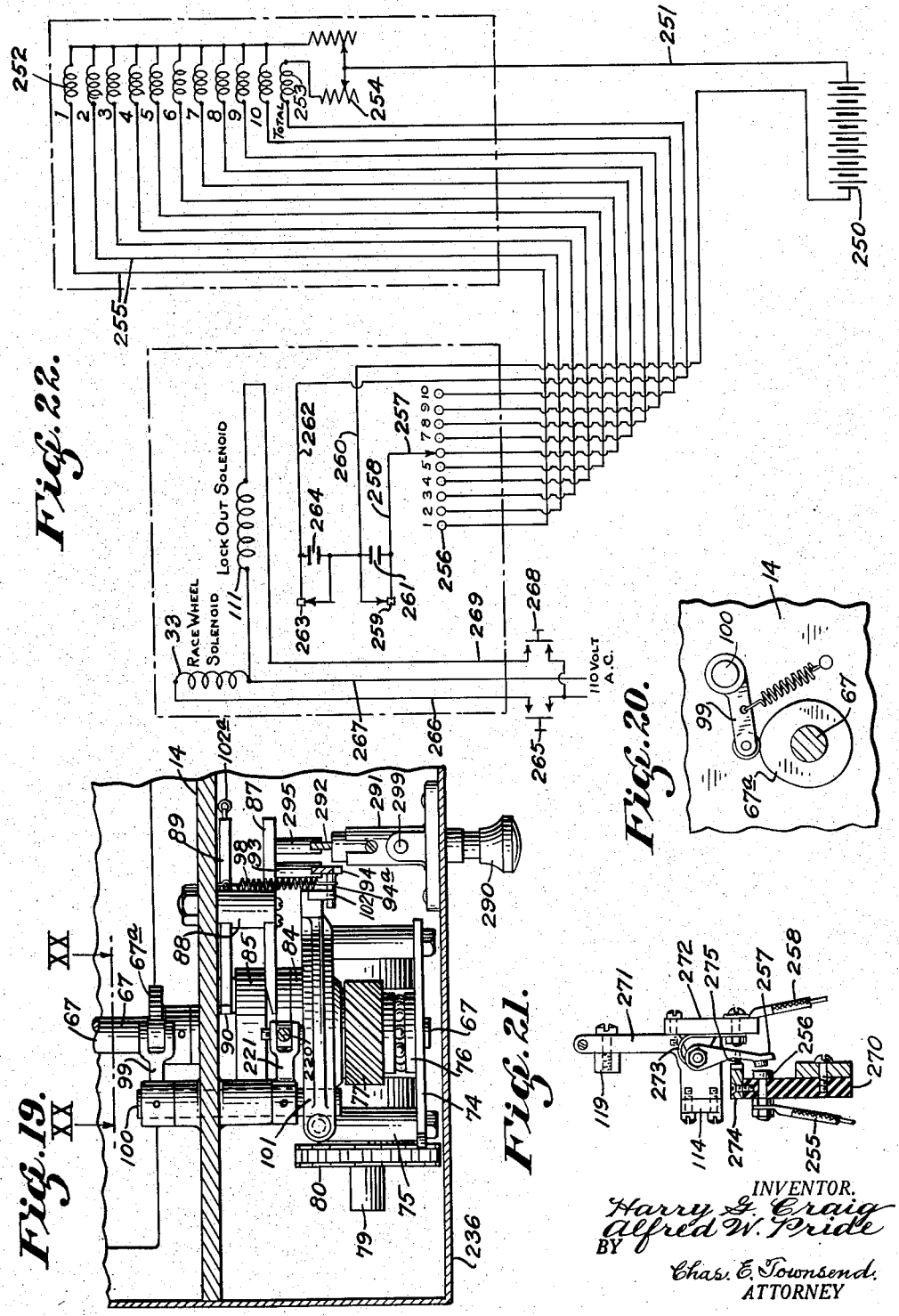
INVENTOR.
Harry G. Craig
Alfred W. Pride
BY Chas. E. Townsend.
ATTORNEY

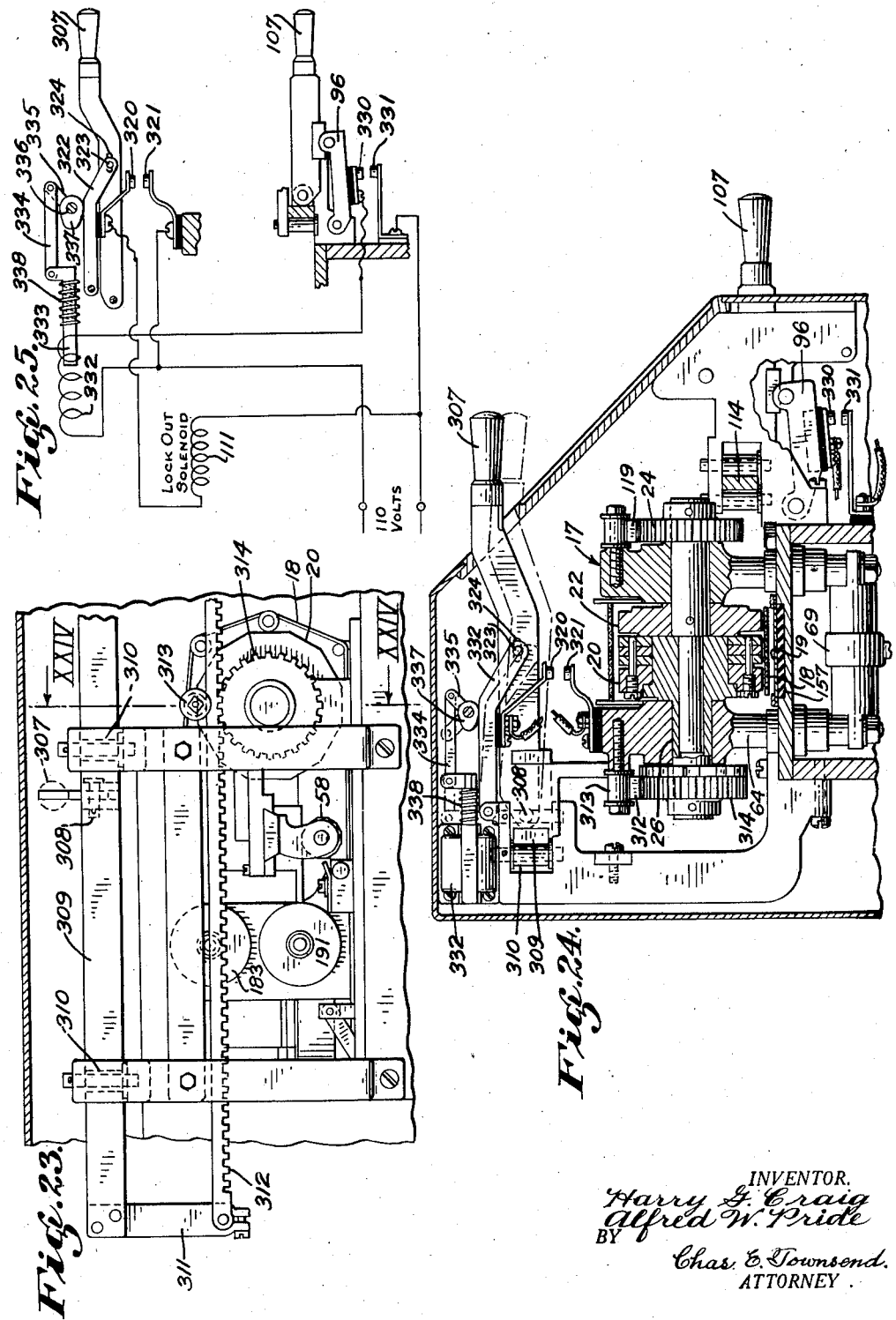

Patented Mar. 14, 1939

2,150,761

UNITED STATES PATENT OFFICE 2,150,761

TICKET PRINTING AND ISSUING MACHINE

Harry G. Craig, San Francisco, and Alfred W. Pride, Oakland, Calif., assignors to Hancock Bros., San Francisco, Calif., a corporation of California Application January 29, 1936, Serial No. 61,376

11 Claims. (Cl. 101—66)

The present invention relates to ticket printing and issuing machines, particularly adapted for use in connection with betting on races or similar contests where the betting "odds" are calculated by the so-called "parimutuel" system.

The invention contemplates the provision of an improved machine for printing and issuing, at the time of their purchase, tickets bearing all information necessary to identify a particular race or races and particular entries, in favor of which a bet is made, together with means for totalizing the tickets issued for each entry and totalizing the tickets issued for the entire race. Provision is also made for preventing inadvertent or unauthorized misuses of the machine to the end of defeating the element of chance which it is intended should control the results of the betting.

It is an object of the present invention to provide a ticket printing and issuing machine, which will obtain all of the desired results through mechanism which is relatively simple and yet positive and accurate in its operation.

A further object of the invention is the provision in a machine of this character of means securely locking the machine against operation at an improper time, which locking means are controllable only by an authorized official.

A further object is the provision of a machine which may be controlled by an official and operated subject to such control by an attendant, to print tickets in a manner to prevent their being counterfeited or altered, and to totalize the number of tickets printed automatically and through positively acting mechanism to prevent an unrecorded sale of any ticket.

A further object is the provision in such a machine of control means which may be operated to produce a very rapid change in the race indicating character printed on the tickets so that the machine may be adjusted between races without loss of time.

A still further object is the provision of a machine, wherein the issuance of but a single ticket and the recording of but a single operation are normally insured, upon movement of a suitable operating member, and having means for disabling the mechanism, which insures single cycle operation to permit continuous operation upon movement of the operating member when it is desired to issue a large number of tickets in rapid succession.

One form of the present invention is exemplified in the accompanying drawings and further of its objects and advantages are made apparent in the following specification, wherein the invention is described in greater detail.

In the drawings:

Fig. 3 is a plan view of the machine with the cover removed.

Fig. 4 is a rear elevation of the machine with the cover removed.

Fig. 5 is a detail view of the portion of the mechanism illustrated in Fig. 4.

Fig. 6 is a view, similar to Fig. 5, showing further details of the same mechanism.

Fig. 7 is a front elevation of the machine with portions thereof shown in section.

Fig. 8 is a sectional view of the printing mechanism of the machine, taken on line VIII—VIII of Fig. 3.

Fig. 11 is a sectional view showing the selector mechanism and taken on the line XI—XI of Fig. 7.

Fig. 12 is an enlarged sectional view of a portion of the mechanism shown in Fig. 11 and showing the position of the parts with the operating lever depressed.

Fig. 13 is an inverted plan view showing counting devices, means for operating them and means for resetting them.

Fig. 14 is a plan view of the counting devices shown in Fig. 13 further illustrating the means for releasing or resetting the counters.

Fig. 15 is a perspective view of the machine.

Fig. 16 is a perspective view of a ticket issued by the machine and illustrating the position of the matter printed thereon by the machine.

Fig. 17 is a front elevation, partly in section, of the lower right-hand corner of the machine shown in Fig. 15 and illustrating the manner in which the housing is locked in place.

Fig. 18 is a perspective view of a portion of the selector mechanism, illustrating means employed for blocking out any desired selection of said mechanism to prevent issuing of a ticket on an entry that has been scratched.

Fig. 19 is a horizontal sectional view, taken on line XIX—XIX of Fig. 7 and showing the details of the clutch control mechanism.

Fig. 20 is a view in detail on the line XX—XX of Fig. 19.

Fig. 21 is a sectional view taken on the line XXI—XXI of Fig. 7 to disclose the construction of a portion of the electrical selection mechanism.

Fig. 22 is a wiring diagram, illustrating the circuits by means of which the operations of the machine may be recorded on a remotely positioned recording device.

Fig. 23 is a rear elevation of the upper right-hand corner of the machine as viewed in Fig. 4 but illustrating a modified form of the invention.

Fig. 24 is a sectional view taken on line XXIV—XXIV of Fig. 23.

Fig. 25 is a diagrammatic view illustrating the electrical circuits employed in the modified structure shown in Fig. 24.

Figure 2:
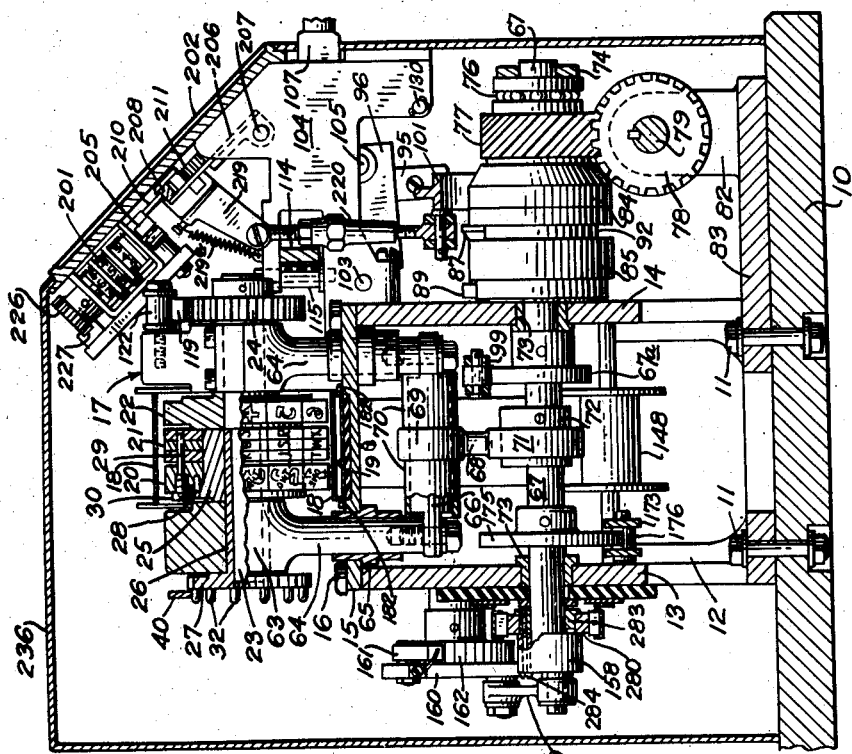
Fig. 2 is a transverse section of the machine, taken on line II—II of Fig. 7.
Figure 1:
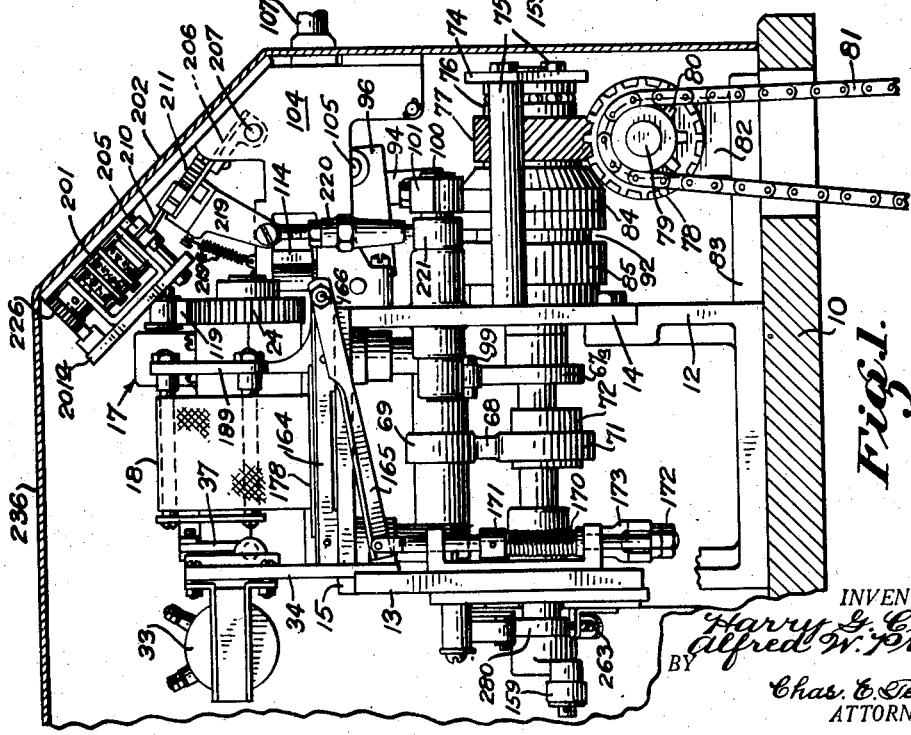
Fig. 1 is an end elevation of the machine embodying the invention, with the end portion of the cover removed.

Referring to Figs. 1, 2 and 3 of the drawings, the machine is shown as supported on a flat, rectangular base member 10, to which is secured, by means of bolts, such as indicated at 11, a U-shaped casting 12. Vertically-extending, generally rectangular plates 13 and 14 are secured to the U-shaped member 12 and support a horizontal table 15 which extends between their upper edges and is secured thereto by means of cap screws 16, as illustrated in Fig. 2. A printing head, generally indicated at 17, is disposed above the table 15 and during operation of the machine is moved vertically downwardly to print through an inked ribbon 18 onto a ticket strip 19 movable over the table. The ribbon 18 and ticket strip 19, together with the mechanism for supporting them and advancing them during the operation of the machine, will be described in detail hereinafter.

The printing head comprises a plurality of rotatable, multi-faced die members. The faces of the die members are provided with characters to be printed, and rotation of the die members permits alignment of various combinations of these characters at the printing position which, in the present case, is their lowermost position.

Referring to Figs. 2 and 3, the first die member, indicated at 20, may be provided with indicia on its printing faces to indicate the number of a particular race. The second die member, indicated at 21, is formed of three separate and independently rotatable sections, each of which die sections may be provided on its printing faces with letters or other suitable characters which, through rotation of these three sections relative to the first die member 20, may be arranged in code combinations which, when read together with a number of the race printed by the first die member, will identify that race positively as to date and time so that the cashier inspecting the ticket can readily determine that it has not been altered by the purchaser to make it appear to have been purchased for any other than that particular race. A third die member, indicated at 22, may bear indicia such, for example, as numbers identifying the entry in the race upon which a bet has been placed.

A rotatable shaft 23 supports the third die member 22, and a gear 24, fixed to the outer end of this shaft, is provided for rotating the same and imparting rotation to the die member 22 by means later to be described, so that the seller dispensing the tickets may adjust the machine to print a ticket for the particular entry upon which a bet has been placed. The first and second die members 20 and 21, respectively, are supported on a hub 25 carried by a sleeve 26 surrounding the shaft 23 and fitted at its outer end with a disk 27 which may be rotated to adjust the positions of the die members 20 and 21 at the time that betting is opened on a particular race. The die member 20 is fixed relative to the bushing 25 by means of pins, such as illustrated at 28, and the separate sections of the die member 21 are fixed relative to the die member 20 by means of a pin 29 carried by a screw 30.

In order to set these sections for a code reading that will identify the race in addition to the identification of the indicia printed by the die member 20, the screw may be removed to withdraw the pin 29. The sections of the die 21 are provided with a series of perforations 31, one for each of the printing faces, as best illustrated in Fig. 8, so that the pin 29 may be reinserted to lock them in any desired printing position relative to the die member 20.

In order to move the die members 20 and 21 to print distinctive tickets for successive races, we provide electrically controlled setting mechanism, best illustrated in Figs. 4, 5 and 6 of the drawings. In these figures, the disk 27 is illustrated as being provided with a plurality of pins 32 projecting outwardly therefrom and corresponding in number and spacing to the printing faces on the die members 20 and 21, so that by advancing the disk 27 through an arc determined by any two adjacent pins 32, the die members will be advanced one position. In order to accomplish this advancing of the die members electrically so that this operation may be controlled from a remote point by an official, we provide an electromagnet 33, which is supported on a bracket plate 34 in such a position that its armature 35 may be connected by a clevis 36 with a lever 37 pivoted, as by a pin 38, to the bracket plate 34. Upon energization of the electromagnet 33, which may be accomplished by any suitable type of switch, such, for example, as a push button disposed at a point where it may be conveniently operated by an official, the armature 35, normally disposed in the position indicated in Fig. 4, is retracted. This causes swinging movement of the lever 37 against the tension of a small spring 39, disposed at the lower end thereof so that a pawl 40, provided with a hooked end and pivoted, as by a pin 41, to the upper end of the lever 37, will engage one of the pins 32 and advance the disk 27, carrying the die members 20 and 21, to the next printing position.

An adjustable stop member 42, carried by a boss 43, cooperates with the lowermost end of the lever 37 and the same boss provides a mounting for a screw 44 to which one end of the spring 39 is secured. To prevent the disk 27 from being carried too far in the event of rapid operation of the electromagnet, we provide a stop member in the form of an L-shaped lever 45 pivoted on a pin 46 and having an end 47 disposed at an angle to be engaged by one of the pins 32 when the disk 27 has rotated the desired distance. The lever 45, as illustrated in Fig. 4, normally is in a position unobstructing the movement of the disk 27, but upon operation of the electromagnet to advance the disk, the lever is moved upwardly to the position illustrated in Fig. 6 by means of its connection with the lever 37 by a link 48 adjustably secured to the lever 37 by a screw 49 and having a bent end received in a slot 50 of the L-shaped lever 45.

To insure proper positioning of the printing faces upon each adjustment thereof from one position to the next, we provide the detent mechanism illustrated in Fig. 5. This comprises a spring-pressed pin 51, carried by a socket 52 which is supported by the bracket plate 34 and bears against a pivoted arm 53 which carries a roller 54 for registry with spaced notches 55 formed in the periphery of the disk 27. The arm 53 is pivoted by means of a pin, indicated at 56, to a supporting arm 57 which extends upwardly and outwardly from the uppermost portion of one of the bearings in which the main shaft of the printing head is journaled, as indicated in Fig. 3.

In order to provide each ticket with the date of its sale and any desired additional printed matter, we provide an auxiliary printing head, as indicated at 58 in Fig. 4. The printing head 58 may be in the nature of any conventional date stamp and is supported on brackets 59 which extend downwardly from a wedge-shaped block 60 which is secured in a similarly shaped channel formed in the underside of a plate 61, which plate is preferably formed integrally with the bearing members of the main printing head, as illustrated in Fig. 3. Screws 26 may be provided for releasing the grip of the wedge-shaped channel on the block 60 to permit removal of the date printer for convenience in re-setting the date and other indicia carried thereby.

This auxiliary printing head, or similar ones supported in the same manner, may be provided to print further information on the ticket such, for example, as the number of the machine, the seller's name, the amount paid, or any other desired classification. It is, of course, to be understood that the ticket strip may have printed upon it any appropriate data not subject to frequent change before it is placed in the machine.

The main printing head which, as described above, is supported on the shaft 23 surrounded by the bushing 26, is journaled in bearings 63, which bearings are formed at the upper ends of a pair of vertically extending shafts 64. The shafts 64 are slidably carried in bearing bushings 65 which extend through the table 15 and are connected at their lower ends by a cross shaft 66.

This cross shaft is connected with the main drive shaft 67 through a connecting rod 68, which is provided with a suitable bearing 69 at its upper end surrounding the cross shaft and held in a central position thereon by means of bushings 70. At its lower end the connecting rod 68 is provided with an eccentric strap 71 embracing an eccentric collar 72 fixed to the main shaft 67 for rotation therewith. Through this connection a single rotation of the main shaft will impart downward movement to the printing head to perform its printing operation and return it to its normal uppermost position or position of rest. The main shaft is journaled in suitable bearings 73 carried by the frame members 13 and 14 and extends forwardly of the frame, terminating in a plate 74 (see Fig. 1) which is supported at the ends of spacer studs 75 extending outwardly from the frame member 14. A thrust bearing 76 is provided adjacent the end of the main shaft to receive the thrust load of a helical gear 77 which meshes with a similar gear 78 on a short shaft 79 which carries a sprocket 80 so that it may be driven by a chain 81 which extends downwardly through a suitable opening in the base in the machine to a driving sprocket (not shown) on a countershaft which is constantly rotating under electric or other suitable motive power.

Figure 9:
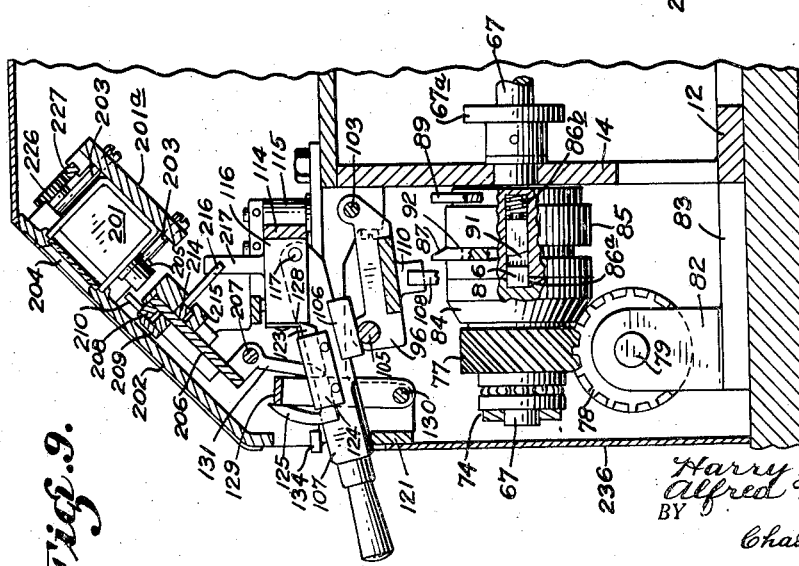
Fig. 9 is a transverse section showing the selector mechanism and taken on the line IX—IX of Fig. 7.

The short shaft 79 is journaled in a pair of upright bosses 82 which may be formed integrally with an extension 83 of the main casting 12. The gear 77 is free to rotate on the main shaft but is fixed relative to the driving member 84 of a clutch, the driven member of which is illustrated at 85. The driven member 85 of the clutch is keyed to the main shaft 67 which is normally at rest and is capable of being operatively connected with the driving member 84 by means of a spring-pressed clutch dog 86, best illustrated in Figs. 7 and 9. In Fig. 9 the dog is shown in driving position such as it will assume during the operation of the machine, and in which position its end is received by the recess 86ª. The clutch dog 86 is normally held in a retracted position against compression springs 86ᵇ by means of a lever 87 which is carried by a stub shaft 88 extending outwardly from the side member 14 and mounted thereon for rocking movement.

A safety latch 89 is likewise carried by the shaft 88 and has an end registering with a notch 90 formed in the periphery of the driven portion of the clutch positively to lock the same against rotation beyond a certain point. The outer end of the lever 87 is formed with a cam-like surface, as illustrated in Fig. 9, for registry with a tapered slot 91 in the dog 86. A groove 92, formed in the driven member of the clutch, guides this end of the lever into registry with the slot 91 to retain the dog in its retracted position.

When the machine is to be placed in operation to print a ticket, the stub shaft 88 which supports the lever 87 and the safety latch 89 is rocked to lift the outer ends of these members. After the latch 89 is removed from its engagement with the notch 90 and the lever 87 is withdrawn from its engagement with the clutch dog 86, the compression spring 86ᵇ forces the dog 86 outwardly in position for engagement with the recess 86ª on the driving clutch member 84, which thereby locks together the two halves of the clutch, the main shaft 67 is caused to move through one complete rotation when the lever 87 (which has been depressed in the groove 92), disengages to move through one complete rotation, the direction of movement being clockwise, as viewed in Fig. 7. Meanwhile the lever 87 has been returned to its normal position to engage the dog 86 and disable the clutch.

The mechanism for moving the lever 87 and latch 89 to place the machine in operation is best illustrated in Figs. 11 and 12, wherein the lever 87 is shown as provided with a pin 93 extending forwardly from its outer end. A trigger 94, pivotally supported between downwardly depending lugs 95 carried by a lever plate 96, is provided with a shoulder 97 adjacent to its lower end to engage with the pin 93 and impart the above described rocking movement to the lever and latch. The trigger 94 is normally held inwardly under tension of a spring 98 and is positively moved outwardly at the proper time in the cycle of the operation of the machine by mechanism shown in Figs. 7, 12 and 19.

The main shaft 67 carries a cam 67ª for this purpose which acts upon a roller on crank arm 99 (see also Fig. 20) to rock a shaft 100, the opposite end of which carries a lever 101 which is provided at its outer end with an inclined cam surface 102 engageable with a pin 94ª on the trigger 94, thus swinging said trigger outwardly to release the pin 93 at the proper time. Upon being released the lever 87 and latch 89 are returned to their normal positions by means of a spring 102ª. Thus the lever and latch, respectively, cause disengagement of the clutch dog and stop the rotation of the main shaft.

The lever plate 96 is pivotally supported on a shaft 103, which is journaled in brackets 104 extending outwardly from the main frame, and is provided adjacent to its forward edge with a longitudinally extending bar 105, which is engaged by a block 106 carried by an operating lever 107, so that upon depression of the operating lever 107 the lever plate is swung downwardly to cause the trigger 94 carried thereby to perform the functions above related. The purpose of the lever plate 96 and the elongated bar 105 carried thereby is to provide for operation of the trigger 94 regardless of the position of the operating lever 107 which, for reasons which will hereinafter be set forth, is adjustable longitudinally of the machine.

In order to lock the machine against operation and provide means making it possible for an official to control the locking and unlocking of the clutch-operating mechanism from a remote point, latch 108 (as shown in Fig. 7) is pivotally supported relative to the side frame 14 by means of a pin 109 and cooperates with a lug 110 which depends from the lever plate 96, so that upon swinging of the latch to the full-line position of Fig. 7 it will prevent downward swinging movement of the lever plate 96 which is necessary to engage the clutch. An electromagnet of any suitable type, indicated at 111 and having a swinging armature 112 connected with the latch 108 by a link 113, may be energized by a suitable switch disposed at any desired point to be operated by an official so that the latch may be withdrawn to the position indicated in broken lines in Fig. 7 to permit the operation of the machine by the seller.

When a bet is placed and a ticket is to be issued for a particular entry, the ticket printing mechanism must be set to print a ticket distinguished by the number that has been assigned to that entry. For this purpose the operating lever 107, which is depressed to actuate the clutch and which extends through the casing of the machine (as indicated in Figs. 12 and 15), is carried by a longitudinally slidable carriage. This carriage comprises a sliding bar 114 (see Figs. 3, 7 and 12) which is guided between pairs of rollers 115 which are journaled in the brackets 104. Rigidly secured to this carriage bar 114 is a block 116, to which is pivoted, as at 117, the operating lever 107. At the extreme right-hand end of the carriage bar 114 (as viewed in Figs. 3 and 12) is provided a bracket 117ª which supports a vertically extending post 118. At the upper end of this post 118 there is pivotally connected a rack-bar 119 which extends to a position overlying and in mesh with the gear 24 which, upon reference back to Fig. 2 of the drawings, will be seen to be the gear which controls the printing position of the die member 22. As the die member 22 is provided with characters which identify the entries in a race, it will appear that upon longitudinal movement of the rack 119 the gear 24 will be rotated to effect a setting of the printing head to print a ticket for any entry chosen. A visible scale, by means of which the selection of an entry may be effected, is provided, as at 120, on the front face of the casing adjacent to the projecting lever 107, and directly beneath the handle is provided a slotted bar 121 which is secured to the forward edges of the brackets 104 (see Fig. 10). The slots in the bar 121 are of just sufficient width to receive the lever 107 when it is depressed and are so shaped that they will insure the longitudinal movement of the lever before it is depressed, being exactly the right distance to cause proper setting of the type face desired on the die member 22. The rack 119 being pivotally supported at one end, as has been described, is free to move up and down during the vertical movement of the printing head, and is meanwhile maintained in mesh with the gear 24 by a roller 122 engaging with the top surface of the rack directly above the gear.

In the event that any entry has been scratched from the race, or if for any other reason any of the numbers from one to ten are not to be used, there is provided a block-out member, such as illustrated at 121ª in Figure 18. This member consists of a short bar, of H-shaped cross section, which may be inserted between the prongs of the slotted bar 121 to prevent depression of the operating lever 107 when it is in a position overlying any one of the slots. Any number of block-out members 121ª may be used temporarily to vary the capacity of the machine.

To insure positive operation of the machine when the operating lever 107 is depressed and prevent moving the lever longitudinally during the first part of the press operating cycle, latching means may be employed (as best illustrated in Figs. 9, 11 and 12). Referring to Fig. 9, the lever 107 is shown as carrying a latch bolt 123 slidable in a guide 124 and having a release finger 125 extending upwardly at its outer end. The opposite side of the latch bolt 123 (as illustrated in Figs. 11 and 12) is provided with a pin 126. A spring 127 cooperating with this pin normally urges the latch toward its innermost position where, upon depression of the operating lever, the latch will engage with the shoulder 128 on the forward face of the block 116 to maintain the lever in its depressed position for a time sufficiently long to insure positive operation of the clutch and also maintain the slidable carriage and members controlled thereby in fixed position during the major portion of the operating cycle.

During the operation of the machine, an inverted U-shaped release bar 129, pivoted at 130, is swung forwardly to engage the release finger 125 and retract the latch so that the operating lever is free to move upwardly to its original position. The release bar 129 is swung forwardly under the influence of a finger 131 (see Fig. 9) on plate 206, which is a part of a pivoted totalizer actuating frame which is oscillated during each operating cycle of the machine in a manner which will hereinafter be fully set forth.

In the event that the operator were to hold his hand on the lever maintaining it in a depressed position at the time that the release bar 129 oscillated to contact the release finger 125, the latch 123 might return to its latching position, permanently maintaining the operating lever 107 in its depressed position and rendering the machine inoperable. In order to avoid such accidental operation of the machine, we have provided the pawl 132 (see Fig. 9), pivoted at 133 and engageable with the pin 126 to retain the latch in its retracted position upon operation of the release mechanism. The latch being thus retained in its retracted position insures return movement of the operating lever 107, even though it may have been held down too long. When the lever 107 is released for upward movement, an end 134 of the pawl 132 engages with the upper edge 135 of the frame opening, through which the operating lever extends. Such engagement releases the pawl 132 to permit the latch bar 123 to move forwardly under tension of the spring 127 where it will be effective upon subsequent operation to retain the operating lever in its depressed position.

The description of the operating lever to this point has been entirely in connection with its use during single operations of the machine. While it is ordinarily desirable that the machine operates in single cycles, it is sometimes necessary to print a large number of tickets at one time. To provide for the printing of a large number of tickets as rapidly as possible, means are employed for blocking out the mechanism, which insures single cycle operation of the machine, to permit multiple operations and thereby reduce the time required for printing a large number of tickets.

To this end, as illustrated in Figs. 11, 12 and 19, a release button 290 extends through the forward face of the housing and is carried for sliding movement in a bearing member 291, so that its inner end may contact the lower end of a finger 292, which is pivoted at its upper end at 293 and is provided with a shoulder 294 engageable with a pin 295 carried by the clutch control member 87 (see also Figure 19). A spring 297 normally swings the finger 292 outwardly, but upon depression of the button 290 it is swung inwardly to a position where its shoulder 294 will overlie the pin 295, thus preventing the normal return of the clutch control member 87 which causes the machine to cease operation at the end of a single cycle. Thus with the button 290 pressed inwardly the machine will continue to operate until it is released.

A pin 299, guided for vertical movement in a bracket 300 and urged upwardly by a spring 301, is adapted to be received by sockets 302 and 303 formed in the stem of the button 290, so that upon depression of the operating lever 107 an arm 304, fixed to the member 105, will be moved downwardly to cause the pin 299 to enter the socket 302, if the button 290 has not been depressed, and to enter the socket 303 if it has been depressed.

When it is desired to print a certain number of tickets, the button 290 is first depressed. The operating lever 107, being first moved to the proper entry position, is then depressed, with the result that the button 290 is locked in its innermost position and the machine will operate continuously until release of the operating lever, thus permitting the pin 299 to be retracted by the spring 301, which, in turn, permits the operating button to be moved outwardly under tension of the spring 297. As the operation of the machine is very rapid when the mechanism for insuring single cycle operation has been disabled in this manner, the operator will be required to watch the totalizing counter or the counter which registers the particular entry for which the large number of tickets are being sold in order to release the operating lever at the proper time.

The ticket strip upon which the printing mechanism acts, together with the mechanism for supporting, advancing and shearing it after a ticket has been printed, is best illustrated in Fig. 4 of the drawings. In this figure a roll 141 of ticket material, in the form of a strip of pasteboard of suitable kind, is shown as supported on a spool 142, having its axle 143 received by slots 144 formed in a pair of vertically extending brackets 145 secured at their lower ends to the base 10. A weighted lever 146 is pivoted on a pin 147 extending transversely between the upright brackets 145 adjacent to their upper ends to bear against the ticket roll 141 at the point where the strip of ticket material is led off therefrom. The weighted lever 146 acts as a brake, offering slight frictional resistance to the unwinding of the ticket roll and preventing the roll from becoming loose on its spool. The strip 19 of ticket material is led around an idler spool 148, which is freely rotatable on a shaft 149 extending between the frame members 13 and 14, and is then led upwardly over the surface of a ticket-advancing drum 150, fixed to a shaft 151, also extending between the frame members 13 and 14.

Figure 10:
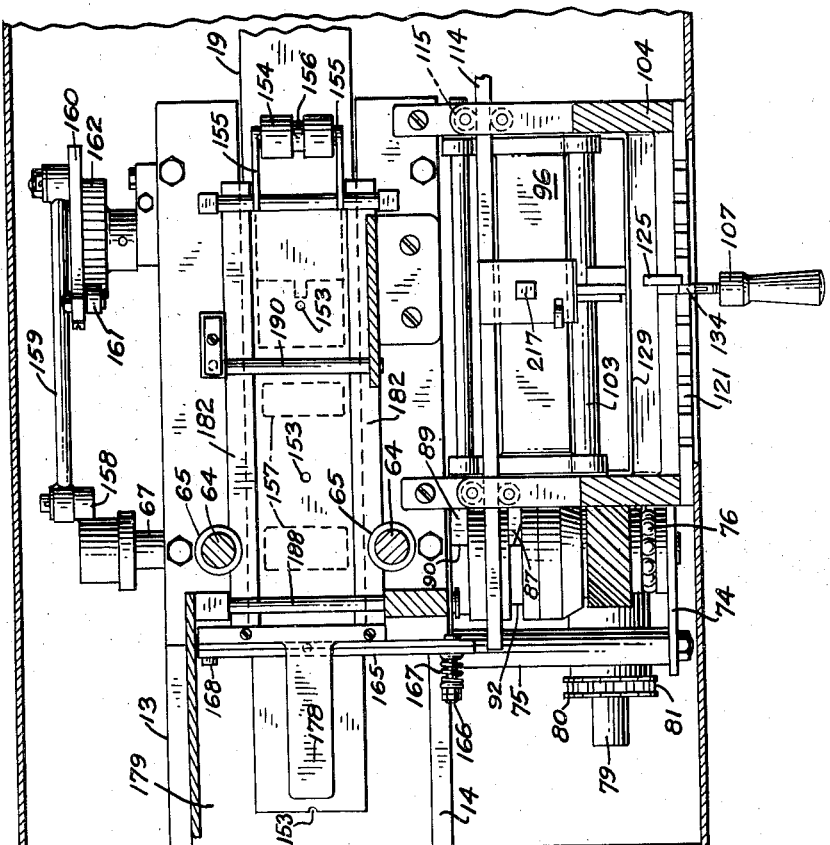
Fig. 10 is a plan view of one end of the machine with the cover and counter mechanism removed to disclose the printing and selecting mechanism.

The peripheral surface of the advancing-drum 150 is provided with spaced projecting pins 152 for registry with perforations 153 formed at spaced intervals in the ticket strip (see Fig. 10). A weighted roller 154, carried by pivoted levers 155, is preferably provided for maintaining the ticket in close contact with the advancing drum 150, this roller being cut away centrally, as at 156, to permit free passage of the projecting pins 152 thereunder. The ticket strip, after leaving the advancing drum, passes over the top surface of the plate 15 and directly beneath the printing head 17 and auxiliary printing head 58. As shown in Fig. 8, the plate 15 is preferably recessed and provided with rubber or other resilient pads 157, which form pliable platens against which the ticket material is pressed during the printing operation. The resiliency of the material of which the pads 157 are formed may be such as is best suited to the type of material being used, it being their principal purpose to permit the printing dies to form a deep impression or embossed effect in the paper so that the printed symbols thereon will be difficult to alter or erase.

The end of the ticket strip is disposed beneath the printing heads prior to operation of the machine, and means are provided for advancing the end of the strip having a ticket printed thereon to a position where it may be sheared from the strip and delivered to the purchaser. The aforesaid means are best illustrated in Figs. 3 and 4, wherein the main shaft 67 is shown as projecting through the frame member 13 to carry a crank 158. The crank 158 is, through a connecting rod 159, operatively associated with the lever 160, which is mounted in a manner permitting its free oscillation on the extreme end of the shaft 151. The upper end of the lever 160 is provided with a spring-pressed pawl 161 arranged to engage with the teeth of a ratchet wheel 162 which is fixed to the shaft 151. As the ticket-strip-advancing-drum 150 is also fixed to the said shaft, rotation of the ratchet wheel 162 will cause the ticket to be advanced over the plate 15. It will be recalled that the main shaft completes a full rotation for each time that the machine is operated to print a ticket. Upon each such rotation, the crank 158 and connecting rod 159 impart an auxiliary movement to the lever 160. During the initial rotation of the main shaft, the lever 160 is moved in a counter-clockwise direction, as viewed in Fig. 4, so that the pawl 161 rides freely over the teeth of the ratchet wheel. During the latter part of this rotation, the lever 160 is moved in the opposite direction so that the pawl engages the teeth of the ratchet wheel to advance the ticket strip to a position where the ticket just printed adjacent to its end may be sheared.

In order that the advancing movement of the ticket strip may be adjusted for the exact length of a ticket, the connecting rod 159 is connected with the lower end of the lever 160 by means, including an elongated slot 163, so that adjustment longitudinally of this slot will vary the movement of the ticket-advancing drum.

During the advancing movement of the ticket strip, the end thereof that has been printed upon is projected over the edge of the table 15 between the uppermost stationary blade 164 and the lowermost pivoted blade 165 of the ticket shears. The blade 165 is pivoted at one end on the pin 166 and is urged into firm contact with the uppermost blade through a spring 167 (shown in Fig. 7). The opposite end of the blade 165 is pivoted to a vertical plunger 168 which slides through guides formed in a bracket 169 and is normally urged upwardly by a spring 170 which is interposed between the lowermost guide and a collar 171 on the plunger.

The lowermost end of the plunger 168 is provided with an adjustable stop 172 which, through contact with a lever 173 pivoted at 174, maintains the plunger and pivoted blade in a downward position. Cam 175, fixed to the main shaft 67, bears against a roller 176 on the lever 173 to maintain the lever in its lowermost position. The cam 175 is provided with a relieved portion, indicated at 177 in Fig. 8, so positioned that upon the final movement of the main shaft it comes into registry with the roller 176. This permits the lever to snap upwardly under the tension of the spring 175 so that the ticket projecting between the blades of the shears is severed. A resilient spring plate 178, shown in Fig. 10, prevents the ticket from being thrown upwardly by the action of the shears and causes it to fall upon an inclined chute 179 from which it slides into a ticket tray 180 through an open gate 181 formed in the side wall of the machine, as illustrated in Fig. 15.

It is preferable that the ticket be guided over the surface of the table 15, as it passes beneath the printing mechanism, and for this purpose we provide guides 182 overlying the edges of the ticket, as illustrated in Fig. 2, to maintain it in close contact with the top of the plate.

It is desirable that an inked ribbon, somewhat in the nature of a typewriter ribbon, be interposed between the ticket and the printing dies to impart a colored hue to the printed characters, and in order to support such a ribbon in a proper position and advance it so that a freshly inked portion thereof will always be in a position for printing, we provide the following mechanism:

The ribbon, which is shown at 18 in Figs. 7 and 8, is stored on a reel 183, fixed on a shaft 184 extending outwardly from a suitable bracket 185 which is supported in a vertical position from the top of the main frame. The ribbon is led from the reel 183 over guide rollers 186, 187 and 188 supported by a bracket 189 to maintain it in a position spaced from the surface of the printing dies. It then passes beneath the main printing head and the auxiliary printing head just above the surface of the ticket strip, being guided by a roller 190 onto a second reel 191 fixed to the shaft 192. By imparting a short rotary movement to either the reel 191 or the reel 183 each time a ticket is printed, the ribbon is slowly advanced in either direction desired.

In order to accomplish such rotation of either one or the other of the ribbon reels, we provide each of them with a ratchet wheel 193 operable by spring-pressed pawl 194, there being one for each ratchet wheel, carried at the upper and lower ends of a rocker 195 pivoted by the pin 196 to a plate 197 which is secured to, and moves up and down with, the printing head frame. Upon vertical movement of the printing head frame, one of the pawls 194 will impart periodic rotation to one of the reels 183 or 191 through the ratchet, depending upon the position of the rocker 195. A detent in the form of a spring 198 and ball 199 (shown in Fig. 3) is provided to retain the rocker in either position. A brake, comprising a flat spring 200 provided with pins 201 at its opposite ends bearing against the side faces of the ratchet wheels, provides sufficient tension on the reels to prevent their rotation by the pawls riding over the ratchet teeth in a reverse direction. When the ribbon is wound on the uppermost reel, the rocket 195 will assume the position shown in Fig. 7 so that the lowermost reel will be periodically rotated to advance the ribbon upon each operation of the machine. When the supply of ribbon has all been wound onto the lowermost reel, the position of the rocker 195 will be reversed and the ribbon will then be drawn from the lower reel and wound upon the uppermost one.

It is essential, particularly where bets are being taken under the "parimutuel" system, to keep a record of the number of bets placed on each entry so that the odds payable on winning tickets may be rapidly computed. For the purpose of keeping such a record, we have provided a bank of totalizing counters, one for each contestant of the race and one for registering the number of tickets sold for all entries. The counters, as shown at 201 in Figs. 1, 2, 9, 13 and 14, may be of any conventional type suitable for this purpose. They are arranged in alignment on a supporting plate 201ª. This plate 201ª is disposed behind a front plate 202 which forms a portion of the front face of the machine. Screws 203 maintain the plates in spaced relation, and windows, such as illustrated at 204 in Fig. 15, are arranged so that the readings on the counters will be visible from the exterior of the machine.

Each of the counters 201 is provided with a lever 205 (see Fig. 13), upon depression of which the counting mechanism is actuated to designate one operation in the conventional manner. Suitable numerals, formed on the front face of the machine as illustrated in Fig. 15, identify the several counters, respectively, with the several positions of the lever 107, so that each time a ticket is sold for any particular entry the counter having the corresponding number will register the sale. The counter at the righthand end of the bank as viewed in Fig. 15 is marked "T" and will register all sales made on the machine and give a reading of the total number of tickets sold.

The mechanism for actuating the counters upon each operation of the machine comprises a plate 206 which is pivoted on a horizontally extending pin 207. A rack bar 208 is mounted for longitudinal sliding movement in a guideway 209 on this plate and carries a pin 210 which overlies the levers 205, by means of which the counting mechanisms are operated. The rack bar 208, as illustrated in Fig. 13, meshes with a gear 211 fixed to a rotatable shaft 212 in common with a smaller gear 213. The small gear 213 meshes with a rack bar 214 slidable in a guideway 215 also extending longitudinally of the plate 206. A forked bracket 216 extends downwardly from the rack bar 214 and embraces a post 217 extending upwardly from the block 116 to which the operating lever 107 is carried. Therefore, upon longitudinal movement of the operating lever to the positions for printing tickets on various entries the rack bar 214 is likewise moved. Movement of the rack bar 214 is transmitted through the gears 213 and 211 to impart movement to the rack bar 208. The ratio between the gears 213 and 211 is such that the pin 210 will be positioned directly above the operating lever of the counting device which corresponds to the position occupied by the main operating lever 107.

A pin 218 is fixed to one end of the guide 209 in a position to overlie the operating lever of the counter which registers the total number of tickets sold by the machine. In order to bring the pins 210 and 218 into contact with the counter levers to actuate the counters, a spring 219ª is provided for urging the plate 206 downwardly about its pivot 207.

Referring to Figs. 1 and 2, an arm 219 is carried by the plate 206. The lower end of the arm 219 is pivotally connected with an adjustable connecting rod 220, the bottom end of which terminates in a crank 221 (see also Figure 7) fixed to the shaft 100. The crank 221 and connecting rod 220 normally maintain the plate 206 raised against the tension of the spring 219ª but as the shaft 100 oscillates, as heretofore described, they permit the spring to swing the plate 206 downwardly to actuate the proper counter once during each cycle of operation. Thus upon each printing operation of the machine the pin 210 will actuate a counter corresponding to the entry for which the ticket was issued and the pin 218 will actuate the counter which registers the total number of tickets sold.

It is customary to take off the readings of these counters at the close of the betting period and use them in computing the odds to be paid on the winning tickets; and it is, therefore, desirable that they may be quickly reset after this reading has been taken so that the reading at the beginning of each race will be "0". For the purpose of quickly resetting all the counters each of them is provided with the conventional stem which may be rotated to turn the dials to a zero reading.

In Figs. 13 and 14 we have shown the resetting stems as fitted with gears 226. A rack 227, extending longitudinally of the bank of counters, meshes with all of these gears and a spring 228 maintains the rack at one end of its path of travel through guide blocks 229. A driving gear 230, similar to the gears 226, also meshes with the rack and through a shaft 231 and bevel gear 232 is connected with a bevel gear 233 on a shaft 234. The shaft 234 extends forwardly through the front face of the machine and is provided with a short crank 235. Upon rotation of the crank 235 the rack 227 is moved longitudinally to reset the counters by rotation of their reset stems. The crank 235 is purposely provided with a very short arm so that it will be impossible to reset the counters without the use of a crank designed for that purpose.

A key crank of suitable design may be provided to slip over the shaft 234 and cooperate with the short crank 235 to give the leverage necessary to perform the resetting operation. It will thus be impossible for the ticket seller inadvertently to change the reading on the counters. Preferably the key crank will be carried by the official who takes the reading from the counters at the end of the race, who, after having taken off the readings, will reset the counters to zero in preparation for the sale of tickets for a subsequent race.

In order that each operation of the machine may be registered at a central point, such as a calculator's room, wherein the odds on the several entries are computed immediately upon closing of the betting period, electrically actuated counting mechanism, diagrammatically illustrated in Figure 22, is provided. Electrical energy from a suitable source, such as a battery 250, is carried by a conductor 251 to a bank 252 of conventional electrically actuated counter mechanisms, one for each entry, and a similar counting mechanism 253 for the total entries, the conventional variable resistance 254 being incorporated in the circuit.

Each of the counters, 1 to 10, inclusive, is connected as by conductors 255 with this series of ten contact points 256 on a selector unit positioned within the machine. A sliding contact 257, engageable selectively with the contacts 256, is connected by means of a conductor 258 with a pair of breaker points 259 which complete a circuit through a conductor 260 to the battery 250. The usual condenser 261 is connected in parallel with the breaker points 259 to reduce arcing thereat. A conductor 262 connects the totalizing counter 253 with a pair of breaker points 263 which complete the circuit to the battery 250 through the common conductor 260. A condenser 264 is also provided in connection with the breaker points 263.

The wiring diagram also illustrates a push-button 265 for completing a circuit through conductors 266, solenoid 33 and conductor 267; the solenoid 33 being that shown in Figures 3 and 4 of the drawings and its function being to advance the die member 20 (see Fig. 2) between races so as to distinguish tickets printed for successive races. A push-button 268 completes a circuit through the conductor 269, solenoid 111 and conductor 267, the solenoid 111 being that shown in Figure 7 of the drawings for the purpose of blocking out the machine to prevent its operation at any time other than during the authorized betting period.

The construction of the selector unit 256 and the means for advancing the member 257 over the contacts thereof are best shown in Figs. 3, 7 and 21 of the drawings. A dielectric plate 270 carries the contact members 256 and is supported in the machine in such a position that the contact finger 257 will be carried thereover upon movement of the operating lever to select an entry. An L-shaped bracket 271, supported by the rack bar 119 and sliding bar 114, supports a dielectric plate 272 which, in turn, forms a support for the pivotally mounted finger 257. A spring 273 normally urges the finger into contact with the contact members 256.

A cam track 274, secured to the top edge of the plate 270, is provided with an irregular surface, as illustrated in Fig. 3, the rises in said cam surface being positioned to engage a dielectric projection 275 on the finger 257 to swing it away from the contact members 256 as it passes between adjacent contact members, thus to prevent bridging as it is moved from one contact member to the other. As the contact finger 275 is carried by the sliding bar 114 and rack 119 which are moved upon manipulation of the operating lever 107 to select an entry, it is apparent that it will be positioned over the contact member 256 corresponding to the entry selected, so that when the breaker points 259 are closed the circuit will be completed through the proper electrically actuated counter 252. The breaker points 259 and the breaker points 263 are intended to complete a circuit through the entry counters and through the totalizer counters, respectively, each time the machine is operated; and for this purpose these breaker points, as best illustrated in Figure 4, are mounted on opposite sides of the main drive shaft 67 in engagement with the notched cam 280 carried by the drive shaft for rotation therewith.

The cam normally engages the breaker points, which are of conventional construction, to maintain the circuit open; but upon operation of the machine, which causes rotation of the cam, the notch 281 thereof registers with the breaker points to permit them to close the circuit momentarily through the entry counter that has been selected and through the totalizer counter. The condensers 261 and 264 are positioned adjacent to the breaker points, as illustrated in Figure 4.

In order that the counting operations may be properly timed with respect to the cycle of operation of the machine, the cam 280 is adjustable on the shaft 67 through means illustrated in Figure 2, wherein the cam is shown as connected to the shaft by being clamped between the hub of the crank 158 and a collar 283. Screws 284 passing through the hub of the crank 158 and into the collar 283 provide sufficient pressure to prevent rotation of the cam relative to the shaft 67 and may be loosened to permit the cam to be rotated for purposes of adjustment.

The entire machine is preferably encased in a housing, such as illustrated at 236 in Fig. 15, to prevent any unauthorized tampering with its operating mechanism. The housing may be locked in place by any suitable mechanism, but preferably by a bar 237 which extends through suitable perforations in the housing and through perforated brackets 238 secured to the base 10 (see Fig. 17).

A notch 239 may be cut in the bar 237 to receive the latch bolt 240 of a suitable lock, such as indicated at 241, and having a keyhole 242 accessible from the exterior of the casing. The key to the lock will, of course, be in the possession of the proper official.

While the locking mechanism described holds the casing securely against the base member 10, it is preferable that the opposite end of the casing be anchored in some suitable manner, and for this purpose we have provided a screw 243 which passes through the opposite end of the casing and into the main supporting base 12.

In the operation of the machine the operator will, upon receipt of a bet on a particular contestant in a race, move the lever 107 to the number identifying that contestant. Assuming that the printing mechanism has been set for the proper race and that the unlocking mechanism has been operated by the remote controls described, the operator will then depress the lever 107 which will effect engagement of the clutch so that the driving means will be engaged to effect printing of a ticket, advancing the ticket strip, shearing the ticket and registering the sale thereof on both the local and remote counter corresponding to the particular contestant for which the ticket was sold and the local and remote counter which registers the total number of tickets sold.

In addition to bets placed upon single entries and single races, it is desirable to provide for so-called "daily double" bets which require the selection of an entry in two races or for bets which comprise the selection of two horses in one race. In order to adapt the machine above described to such double betting, the modification illustrated in Figures 23, 24 and 25 is resorted to. In these figures of the drawings the die member 20, which is described above as used to designate a particular race, is adapted for selection of an entry in one race, whereas the die member 22 is used in the manner above described to select an entry for another race. In order to adapt the die member 20 to the selection of entries an operating lever 307, similar to the operating lever 107, is provided to project through the forward face of the machine at a position above that of the first described operating lever. The lever 307 extends to the rear of the housing and is pivotally connected by a pin 308 to a bar 309 which is longitudinally slidable through sets of rollers 310 and connected at one end by means of an arm 311 with the rack bar 312.

This rack bar is pivoted at its connection with the arm 311 and retained by a roller 313 in meshing engagement with a gear 314 which is fixed to the sleeve 26 which carries the die member 20. Thus by setting the operating lever 307 to select a desired entry for one race and by setting the operating lever 107 to select the desired entry for another race and then depressing the lever 107 to operate the machine in the manner above described a double entry ticket may be printed.

In the operation of printing daily double tickets with the mechanism above described, it is desirable to insure against depression of the operating lever 107 to select an entry and print a ticket until after the operating lever 307 has been depressed to select an entry. It is also important that the lever 307 be held in its depressed position throughout the entire printing operation so that there will be no possibility of a change in the entry selection of said lever prior to or during the printing.

To accomplish these ends, electrically controlled interlocking means of the type illustrated in Figs. 24 and 25 may be employed. To prevent operation of the lever 107 before depression of the lever 307, a switch comprising contact members 320 and 321 is controlled by the lever 307 and is placed in circuit, as illustrated in Fig. 25, with the lock-out solenoid 111, which has also been described in connection with Fig. 22 and which effects withdrawal of the lock-out member 108 illustrated in Fig. 7. The upper contact member 320 of this switch is carried by a pivoted arm 322, which is operably connected with the lever 307 by a transversely extending bar 323 which passes through a slot 324 in this lever. This permits free adjustment of the lever 307 necessary to select an entry and causes downward swinging of the arm 322 upon depression of the lever 307 at any point. This downward movement of the arm 322 completes the circuit through the contact members 320 and 321 to energize the lock-out solenoid 111 which will withdraw the lock-out member 108. With this construction it is impossible to actuate the lever 107 to place the ticket-printing mechanism in operation until the lever 307 has been depressed.

A pair of contacts 330 and 331 is controlled by the lever 107. The upper contact 330 is carried by the lever plate 96 which swings downwardly upon depression of the lever 107; thus, to complete a circuit through a solenoid 332 to cause retraction of the armature 333 thereof. A connecting rod 334 connects this armature with a crank 335 fixed to a shaft 336 upon which is carried a cam 337. The cam 337 is so shaped that upon retraction of the armature 333 its high point will bear against the arm 322, the lever 307 and arm 322 being in their depressed position, and lock this arm against return movement. Therefore, as long as the operating lever 107 is retained in its depressed position, the operating lever 307 must remain in the same position and can not be moved laterally to effect a change in the entry selected by it. Upon release of the lever 107, the circuit, through the contacts 330 and 331, is broken to effect deenergization of the solenoid 332, and spring means, such as the coil spring 338 surrounding the armature 333, will return the cam 337 to the position illustrated in Fig. 25 and permit the lever 307 to return to its normal position. Owing to the system which interlocks the levers 107 and 307, it is impossible to depress the lever 107 until after depression of the lever 307, and it is impossible for the lever 307 to return to its normal position until after the lever 107 has returned.

While we have illustrated and described our invention in terms of a specific embodiment thereof, it should be understood that various modifications may be resorted to in the construction and arrangement of its several parts within the scope of the appended claims.

What we claim is:

1. In a ticket machine comprising printing means, registering means, and means for actuating the printing and registering means, a depressible operating lever for placing the driving means in operation, means for latching the operating lever in its depressed position until the printing and registering means have been placed in operation, means releasing the latching means and retaining it in an inoperative position until the operating lever has been released, and means effective upon return of the operating lever to normal position to disable the retaining means.

2. In a ticket issuing machine, a printing mechanism adjustable to print tickets of various classifications, a plurality of registering devices, one for each classification, a sliding and pivoting carriage movable to stations corresponding to said classifications, connections between said carriage and printing mechanism whereby movement of the carriage will effect adjustment of the printing mechanism, a movable member for actuating said registering devices, means for moving said member upon sliding of the carriage to a position adjacent to a registering device identified with the position of the printing mechanism, an operating lever for pivoting the carriage, means actuated by pivoting of the carriage to cause the printing mechanism to print the classification selected and to cause the said member to actuate the registering device selected.

3. In a machine of the class described comprising mechanism for printing tickets of different classification, an operating lever movable in one direction to various stations to select the classification to be printed, and depressible at any station to initiate the printing operation, a slotted bar underlying said operating lever to guide it as it is depressed at any station, and block out members fitting the slots of said lever to prevent its depression at any desired station.

4. In a ticket issuing machine, driving means, a clutch between the driving means and the ticket issuing mechanism, an operating lever for effecting engagement of the clutch, means releasing the clutch automatically upon operation of the mechanism for a single ticket issuing cycle, means for disabling said releasing means, and means controlled by said operating lever to lock said means for disabling against movement during operation of the operating lever.

5. In a machine of the class described comprising ticket printing mechanism, drive means, and a clutch connecting said mechanism and means, a clutch operating lever, means for releasing the clutch automatically upon operation through a predetermined cycle, a reciprocable member for disabling the automatic clutch releasing means, and means controlled by the operating lever to lock said reciprocable member in its depressed position while the lever is in its clutch operating position.

6. In a ticket printing and issuing machine, printing mechanism comprising die members adjustable to effect selection of the data to be printed, a lever operable to adjust one of said die members, a second lever operable to adjust another of said die members and to effect operation of the printing mechanism, locking means effective to prevent operation of the printing mechanism by said second lever until the first lever has been actuated to effect a selection, and means to prevent movement of the first lever during operation of the printing mechanism.

7. In combination with a ticket printing and issuing machine of the character described, a rotatable multi-faced printing member, a disk connected to said member to rotate therewith, pins projecting from said disk and corresponding in number and spacing to the faces on the printing member, a pawl engageable with one of said pins to move the printing member, a stop member engageable with another of said pins to limit such movement, and means for actuating said pawl and stop member simultaneously to effect movement of the printing member the distance between its adjacent printing faces.

8. In a ticket printing and issuing machine, an operating lever movable in one direction to effect a selection of the data to be printed on a ticket and movable in another direction to initiate operation of printing and issuing mechanism, and remotely controlled lock-out means to prevent movement of said member in the last-named direction.

9. In a ticket printing and issuing machine, the combination of a rotary multi-faced printing member, an operating lever movable in a straight line, connecting means between said lever and printing member whereby movement of the lever will effect adjustment of the printing member to vary the data printed thereby, a selecting device in the machine to effect selection of circuits to electrical registering devices, means carried by said connecting means to select a circuit on said selecting device corresponding to the adjustment of the printing member, mechanical registering devices in said machine, and other means controlled by said connecting means to select for operation one of said mechanical registering devices corresponding to the adjustment of the printing member.

10. A ticket printing and issuing machine comprising at least two adjustable printing members, a lever operable to adjust one of said members, a second lever operable to adjust another of said members and to effect operation of the printing mechanism, and means for preventing operation of the printing mechanism by said second lever until the first lever has been actuated to adjust its printing member.

11. A ticket printing and issuing machine comprising at least two adjustable printing members, a lever operable to adjust one of said members, a second lever operable to adjust another of said members and to effect operation of the printing mechanism, and means for holding the member adjusted by the first lever in its adjusted position until completion of the operation of the printing mechanism.

HARRY G. CRAIG.
ALFRED W. PRIDE.